US009981700B1

(12) United States Patent
Garrison et al.

(10) Patent No.: US 9,981,700 B1
(45) Date of Patent: May 29, 2018

(54) CARGO SYSTEM FOR A VEHICLE (71) Applicant: GM GLOBAL TECHNOLOGY OPERATIONS LLC, Detroit, MI (US)

(72) Inventors: Cheryl A. Garrison, Shelby Township, MI (US); Derek L. Patterson, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days. days.

(21) Appl. No.: 15/410,047

(22) Filed: Jan. 19, 2017

(51) Int. Cl.
| B60P 3/40 | (2006.01) |
| B62D 33/027 | (2006.01) |
| B62D 33/037 | (2006.01) |

(52) U.S. Cl.
CPC ............ *B62D 33/0273* (2013.01); *B60P 3/40* (2013.01); *B62D 33/037* (2013.01)

(58) Field of Classification Search
CPC ..... B60P 3/40; B62D 33/027; B62D 33/0273; B62D 33/037; B60R 2011/004; B60R 9/06
USPC ........................ 296/50, 51, 57.1, 37.6, 26.02, 296/26.08–26.11, 3
See application file for complete search history.

(56) References Cited

U.S. PATENT DOCUMENTS

| 5,443,190 | A | * | 8/1995 | Cucheran | ................... | B60R 9/00 |
| | | | | | | 224/309 |
| 5,988,722 | A | * | 11/1999 | Parri | ....................... | B60P 1/003 |
| | | | | | | 224/403 |
| 6,402,215 | B1 | * | 6/2002 | Leitner | ...................... | B60P 3/40 |
| | | | | | | 296/26.11 |
| 6,722,541 | B1 | * | 4/2004 | Aftanas | ..................... | B60R 9/00 |
| | | | | | | 224/321 |
| 6,913,175 | B2 | * | 7/2005 | Martin | ..................... | B60R 9/00 |
| | | | | | | 224/403 |
| 6,976,724 | B2 | * | 12/2005 | Wheatley | ................. | B60J 7/062 |
| | | | | | | 296/100.15 |
| 7,413,230 | B1 | * | 8/2008 | Sage | .................. | B62D 33/0273 |
| | | | | | | 296/26.08 |
| 8,348,331 | B2 | * | 1/2013 | Holt | ...................... | B60P 7/0815 |
| | | | | | | 224/403 |
| 8,608,219 | B1 | * | 12/2013 | Platto | ................. | B62D 33/0273 |
| | | | | | | 296/26.05 |
| 8,864,001 | B2 | * | 10/2014 | Langseder | ............. | B60R 5/041 |
| | | | | | | 224/405 |
| 2004/0227368 | A1 | * | 11/2004 | Seksaria | ................... | B60P 3/40 |
| | | | | | | 296/26.1 |
| 2007/0096486 | A1 | * | 5/2007 | Niedziela | .................. | B60P 3/40 |
| | | | | | | 296/3 |
| 2009/0026789 | A1 | * | 1/2009 | Ferrell | ..................... | B60P 3/40 |
| | | | | | | 296/57.1 |

(Continued)

*Primary Examiner* — Gregory A Blankenship
(74) *Attorney, Agent, or Firm* — Quinn IP Law (57) ABSTRACT

A vehicle includes a body and a cargo area at least partially defined by the body. A tailgate assembly is adjustably connected to the body and movable relative to the body between a first position and at least one second position. The tailgate assembly includes a structure having a first lateral edge and a second lateral edge. A cargo system is operatively connected to the tailgate assembly. The cargo system includes an extension member having a housing, a first arm extending from a first side of the housing securable to the first lateral edge of the tailgate structure and a second arm extending from a second side of the housing securable to the second lateral edge of the tailgate structure.

20 Claims, 3 Drawing Sheets

(56) References Cited

U.S. PATENT DOCUMENTS

| | | | |
|---|---|---|---|
| 2009/0160206 A1* | 6/2009 | Pleet | B60P 3/14 296/50 |
| 2009/0200823 A1* | 8/2009 | Vertanen | B60P 3/40 296/26.08 |
| 2010/0096872 A1* | 4/2010 | Brogdon | B60R 9/00 296/3 |
| 2011/0042990 A1* | 2/2011 | Holt | B60P 7/0815 296/37.6 |
| 2013/0229025 A1* | 9/2013 | Johnasen | B60P 3/00 296/3 |
| 2015/0203050 A1* | 7/2015 | Finestone | B60R 3/40 296/3 |
| 2017/0066384 A1* | 3/2017 | Finestone | B60R 9/06 |

* cited by examiner

CARGO SYSTEM FOR A VEHICLE

INTRODUCTION

The present disclosure relates to a cargo system for a motor vehicle.

Vehicles, such as pickup trucks and sport utility vehicles (SUVs) frequently employ storage compartments for carrying personal belongings of the vehicle's passengers and cargo. A pickup truck may include a rear storage compartment with an open top that is otherwise known as a bed. Typically, a pickup truck employs a closure panel or tailgate to close off an end of the cargo area and the bed for retaining cargo therein. Such a tailgate may be pivotally attached to the bed for enhanced utility and convenience. The tailgate assembly of a SUV may be used to close the enclosed rear cargo area of the SUV.

SUMMARY

A vehicle includes a body and a cargo area at least partially defined by the body. A tailgate assembly is adjustably connected to the body and movable relative to the body between a first position and at least one second position. The tailgate assembly includes a structure having a first lateral edge and a second lateral edge. A cargo system is operatively connected to the tailgate assembly. The cargo system includes an extension member having a housing, a first arm extending from a first side of the housing securable to the first lateral edge of the tailgate structure and a second arm extending from a second side of the housing securable to the second lateral edge of the tailgate structure.

The tailgate assembly is disposed in the first position when the body covers both the first and second lateral edges of the tailgate structure to restrict access to the cargo area and the at least one second position when the first and second lateral edges of the tailgate structure are moved relative to the body to expand the cargo area. The tailgate assembly includes a tailgate latch system operable to latch the tailgate assembly to the body.

The first arm of the cargo system extension member releasably engages a first portion of the tailgate latch system on the first lateral edge of the tailgate structure and the second arm of the cargo system extension member releasably engages a second portion of the tailgate latch system on the second lateral edge of the tailgate structure. Each of the first arm and second arm of the extension member includes a mechanism configured to releasably engage each of the first and second portion of the tailgate latch system and position the extension member relative to the tailgate structure. The cargo area is at least partially defined in a storage compartment of the vehicle body having a front wall, a first sidewall extending from the front wall, a second sidewall extending from the front wall and disposed opposite the first sidewall and a floor cooperating with and extending between the front wall and the opposing first and second sidewalls.

At least one attachment point is disposed on at least one of the first and second sidewalls. The cargo system includes an auxiliary storage unit having one or more support rails releasably secured to the at least one attachment point and extending generally laterally through the cargo area between one or more of the first and second sidewalls and above the floor. The auxiliary storage unit is removably connected to the cargo area to position the auxiliary storage unit generally planar to the extension member disposed on the tailgate structure when the tailgate structure is positioned in the at least one second position.

A first support rail extends generally laterally between and is releasably secured to the at least one attachment point on the first and second sidewalls adjacent the front wall of the cargo area. A second support rail extends generally laterally between and is releasably secured to the at least one attachment point on the first and second sidewalls adjacent the tailgate structure such that the first and second support rails of the auxiliary storage unit are generally planar with the housing of the extension member on the tailgate structure when the tailgate structure is in the at least one second position.

In another embodiment, a cargo system for a vehicle for use in cargo area at least partially defined in a vehicle body having a front wall, a first sidewall, an opposing second sidewall, a floor cooperating with and extending between the front wall and opposing first and second sidewalls and a tailgate structure adjustably connectable to the vehicle body having a tailgate latch system disposed on first and second lateral edges is provided. The cargo system includes an extension member having a housing, a first arm extending from a first side of the housing securable to the first lateral edge of the tailgate structure and a second arm extending from a second side of the housing securable to the second lateral edge of the tailgate structure. Each of the first arm and the second arm of the extension member includes a mechanism configured to releasably engage first and second portions of the tailgate latch system to position the extension member relative to the tailgate structure.

At least one attachment point is disposed on at least one of the first and second sidewalls of the cargo area. An auxiliary storage unit includes one or more support rails extending between and are releasably secured to the at least one attachment point on the first and second sidewalls. The auxiliary storage unit is removably connected to the cargo area to position the auxiliary storage unit generally planar to the extension member when the tailgate structure is positioned in the at least one second position.

The auxiliary storage unit further includes a first support rail extends generally laterally between and is releasably secured to the at least one attachment point on the first and second sidewalls adjacent the front wall of the cargo area while a second support rail extends generally laterally between and is releasably secured to the at least one attachment point on the first and second sidewalls adjacent the tailgate structure. The first and second support rails are generally planar with the housing of the extension member when the tailgate structure is in the at least one second position.

The above features and advantages and other features and advantages of the present disclosure are readily apparent from the following detailed description of the best modes for carrying out the disclosure when taken in connection with the accompanying drawings.

DETAILED DESCRIPTION

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity, directional terms such as top, bottom, left, right, up, over, above, below, beneath, rear, and front, may be used with respect to the drawings. These and similar directional terms are not to be construed to limit the scope of the disclosure.

Figure 1:
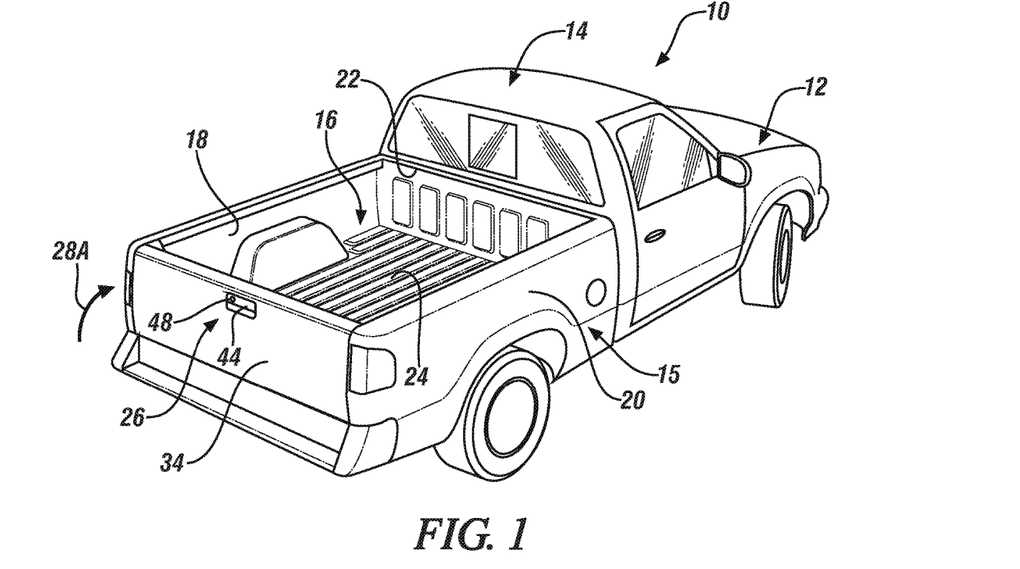
FIG. 1 is a perspective view of a vehicle showing a tailgate assembly in a first position in accordance with the present disclosure.
Figure 2:
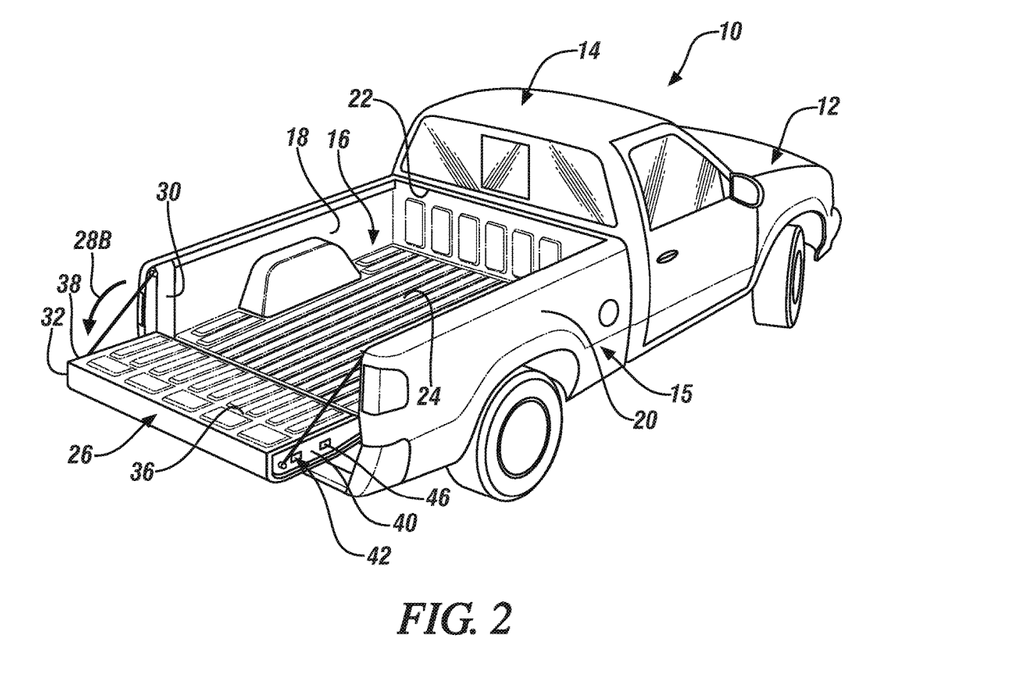
FIG. 2 is a perspective view of the vehicle showing the tailgate assembly in a second position.

Referring to the drawings, wherein like reference numbers correspond to like or similar components throughout the several Figures, a vehicle is generally shown at 10. Referring to FIGS. 1 and 2, the vehicle 10 is shown configured as a pick-up truck. However, it should be appreciated that the vehicle 10 may be configured in some other manner, such as a Sport Utility Vehicle (SUV), or other similar style that uses an end gate or tailgate, hereinafter referred to as a tailgate assembly 26, to close a cargo area 16 of the vehicle 10. Alternatively, the vehicle may include, but not be limited to, a commercial vehicle, industrial vehicle, passenger vehicle, aircraft, watercraft, train or any mobile platform. It is also contemplated that the vehicle may be any mobile platform, such as an airplane, all-terrain vehicle (ATV), boat, personal movement apparatus, robot and the like to accomplish the purposes of this disclosure.

The vehicle 10 includes a vehicle body 12. The vehicle body 12 includes a passenger compartment 14 and a storage compartment 15 at least partially defining a cargo area 16 therein. As shown, the passenger compartment 14 is a pickup truck cab, while the cargo area 16 is configured as a bed of a pickup truck and is generally adapted to carry bulky cargo. Although not shown, generally the vehicle body 12 of such a motor vehicle also includes a powertrain compartment for housing such sub-systems as engine, electric motor(s), and transmission.

The cargo area 16 may be enclosed on four sides but, as shown, may be arranged without a top cover, and therefore remain unrestricted from above. The cargo area 16 includes a plurality of generally vertical perimeter walls, shown as a first sidewall 18, a second sidewall 20, and a front wall 22. The first sidewall 18 may be configured as a left sidewall of the cargo area 16, while the second sidewall 20 is configured as a right sidewall opposing the left sidewall 18. The first sidewall 18 and the second sidewall 20 are arranged substantially parallel to each other and may both extend from the front wall 22.

The front wall 22 may be a component of the cargo area 16 or, alternatively, a rear surface of the passenger compartment 14 of the vehicle 10, such as a vehicle seat or other interior or exterior panel. The cargo area 16 also includes a bed or floor 24 and a tailgate assembly 26 disposed proximate the floor 24. The floor 24 extends generally laterally between the first sidewall 18 and the second sidewall 20, and longitudinally between the front wall 22 and the tailgate 26. While the vehicle 10 is shown as a pickup truck, it should be appreciated that it may be any vehicle that has walls and a floor or a base defining a cargo area.

As shown in FIG. 1, the tailgate assembly 26 is operatively connected to the vehicle body 12 to selectively restrict access to the storage compartment by being closed or placed in a first position, as identified by arrow 28A and shown in FIG. 1, and expand access to the storage compartment 16 by being opened or placed in at least one second position, as identified by arrow 28B and as shown in FIG. 2. The vehicle 10 includes an open cargo area 16, including a floor or bed 24 defined therein. However, it should be appreciated that the disclosure may be applied to other types of vehicles that include an enclosed cargo area 16, such as an SUV, that is enclosed by the vehicle body 12.

The tailgate 26 may be operatively connected to the sidewalls 18, 20 of the vehicle body 12 via a hinge mechanism 30 for rotational movement relative to the sidewalls 18, 20 about a generally horizontal axis. However, it should be appreciated that the tailgate assembly 26 may be movably attached to the vehicle body 12 for rotational movement relative to the body 12 about a generally vertical axis. Alternatively, the tailgate 26 may alternatively be operatively connected to the floor 24 via bearings.

The walls 18, 20, 22, the floor 24, and the tailgate 26 are together configured to at least partially define the functional, i.e., cargo-carrying, area of the cargo area 16. As shown in FIGS. 1 and 2, when the tailgate 26 is closed, the length of the storage compartment 16 is coextensive with the length 26 of the sidewalls 18, 20. Typically, a panel structure of the cargo area 16, including the walls 18, 20, and 22, the floor 24, and the tailgate 26, are formed from a suitably impact-resistant and weather-resistant load-carrying material, such as a specifically engineered composite, aluminum, or steel.

The tailgate assembly 26 includes a structure 32. The structure 32 may include one or more components formed to define the shape of the tailgate 26, and provide the required structural rigidity. The structure 32 may include one or more frame members, braces, exterior and/or interior panel members, trim pieces, etc., attached together to define the completed assembly. The structure 32 includes an exterior surface 34 and an interior surface 36. The structure 32 includes a first lateral edge surface 38, and a second lateral edge surface 40.

The interior surface 36 is disposed adjacent the cargo area 16, within the interior of the vehicle 12 defining the cargo area 16, when the tailgate 26 is disposed in the first position. As such, the interior surface 36 may be defined as the interior of the tailgate 26. The exterior surface 34 defines the exterior of the tailgate 26, and is disposed generally opposite from the interior surface 36. The first lateral edge surface 38 and the second lateral edge surface 40 are disposed opposite each other, at opposing lateral edges of the exterior surface 34 and the interior surface 36.

As such, the first lateral edge surface 38 and the second lateral edge surface 40 extend between the exterior surface 34 and the interior surface 36. Referring to FIG. 1, when the tailgate 26 is disposed in the first or closed position, the first lateral edge surface 38 and the second lateral edge surface 40 are concealed and/or covered by the sidewalls 18, 20 of the vehicle body 12. Referring to FIG. 2, when the tailgate 26 is disposed in the second or open position, the first lateral edge surface 38 and the second lateral edge surface 40 are moved relative to the vehicle body 12 such that edges 38, 40 are exposed and accessible and thereby expand the cargo area 16.

The tailgate assembly 26 includes a tailgate latch system 42, which is operable to latch the tailgate 26 to the vehicle body 12, when the tailgate assembly 26 is disposed in the first position. The tailgate latch system 42 may be configured in any suitable manner. For example, the tailgate latch system 42 may include a handle 44 that is operable to actuate at least one latch 46 disposed at the first and second lateral edges 38, 40 of the structure 32 respectively. The at least one tailgate latch 46 is operable to latch the tailgate assembly 26 to the storage compartment 15 of the vehicle body 12, and may be configured in any manner suitable for the specific configuration of the vehicle 20.

The tailgate latch system 42 may further include a lock assembly 48 that is operable to lock the tailgate latch system 42 and secure the tailgate 26 to the vehicle body 12 in the first position shown in FIG. 1. The lock assembly 48 may be configured in any suitable manner that is capable of locking the tailgate latch system 42. When locked, the lock assembly 48 prevents the release of the tailgate latch system 42, thereby preventing the rotational movement of the tailgate 26 relative to the vehicle body 12, and keeping the tailgate 26 secured in the first or closed position. When the lock assembly 48 is unlocked, the lock assembly 48 allows movement of the tailgate 26 relative to the vehicle body 12 to a second or open position as shown in FIG. 2 such that the interior surface 36 of the tailgate structure 32 may be positioned proximate to and generally planar with the floor 24 of the cargo area 16.

Referring additionally now to FIGS. 3-6, vehicle 10 includes a cargo system 50. Cargo system 50 cooperates with the vehicle body 12 and tailgate assembly 26 of the vehicle 10 to receive and removably secure one or more items 52 therein. In one embodiment of the disclosure, each of the first and second sidewalls 18, 20 of the cargo area 16 includes an identical attachment configuration as is shown in the Figures. However, it is understood that the first and second sidewalls 20, 22 may have distinct configurations while accomplishing the purpose of the disclosure.

Figure 4:
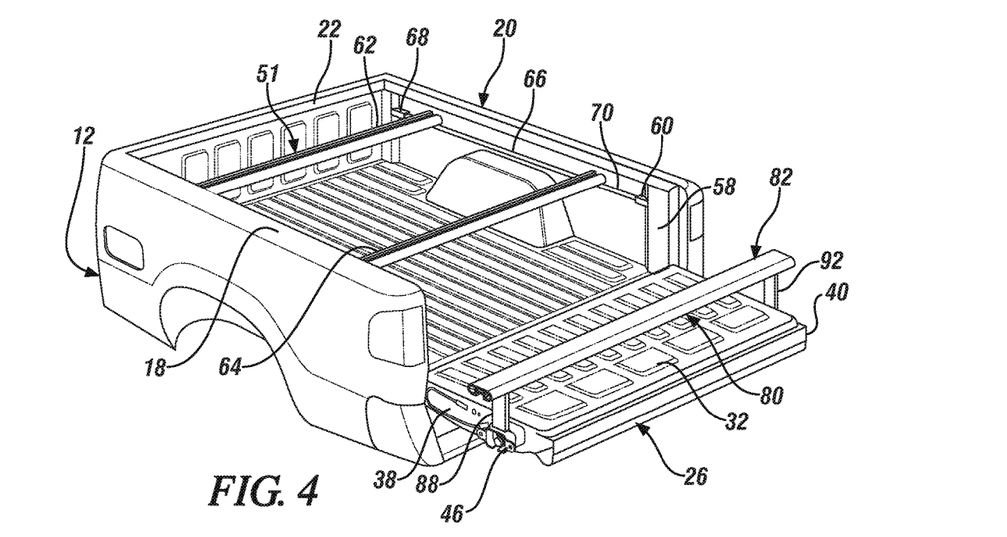
FIG. 4 is a perspective view of components of the storage management system disposed in the cargo area of the vehicle.

FIG. 4 illustrates the attachment configuration disposed on a portion of the second sidewall 20 of the cargo area 12 of the vehicle 10. Sidewall 20 includes an inner periphery 54 having a first or front attachment surface 56 provided proximate to the front wall 24 of the cargo area 16 and a second or rear attachment surface 58 provided proximate the tailgate assembly 26. At least one attachment point attachment point 60 is provided on the inner periphery 54 of the second sidewall 20.

In one embodiment, the at least one attachment point 60 may be formed as an arcuate shaped portion or eyelet that is mounted to or integrally formed in the inner periphery 54 of the second sidewall 20 to receive and secure a mating portion of at least one elongate body 62 of an auxiliary storage unit 51 of the cargo system 50. The at least attachment point 60 may be provided in various quantities and formed in a variety of geometries and configurations to accomplish the purposes of the disclosure. In one embodiment of the disclosure and as shown in additionally in the rear portion of the sidewall in FIG. 5, a plurality of attachment points 60 are provided in a generally vertical arrangement on the sidewall 20.

Figure 3:
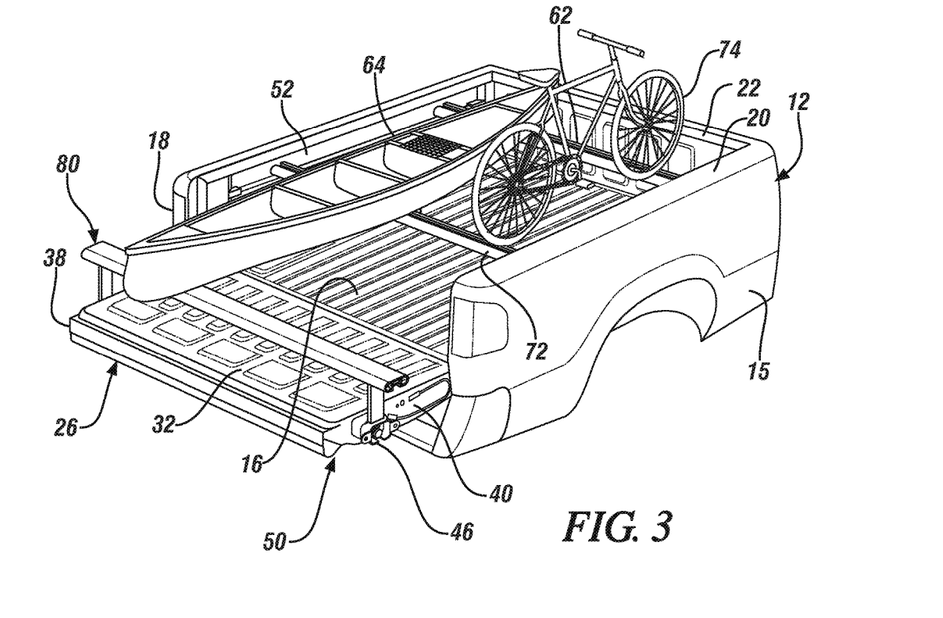
FIG. 3 is a perspective view of a storage management system for use in the cargo area of the vehicle releasably securing one or more items.

As illustrated in FIG. 3, one or more support rails 62 cooperate with and are secured to the at least one attachment point 60. The one or more support rails 62 may extend laterally across the cargo area 16 and generally laterally relative to the longitudinal axis (not shown) and the first and second sidewalls 18, 20 of the cargo area 16. Support rails 62 may be releasably attached to the at least one attachment point 60.

The one or more support rails 62 may include a first support rail 62 releasably secured to at least one attachment point 60 disposed on the front attachment surfaces 56 of the first and second sidewalls 18, 20 and a second support rail 64 releasably secured to at least one attachment point 60 disposed on the rear attachment surface 58 of the first and second sidewalls 18, 20. First and second support rails 62, 64 may include one or more mounting members 72 capable of receiving and mounting an item such as a bicycle 74 or the like. The first and second support rails 62, 64 may be positioned in the cargo area 16 generally planar with the housing 82 of the extension member 80 described in greater detail below when the tailgate structure 32 is in the at least one second position shown in FIG. 2.

In one embodiment illustrated in FIG. 4, the auxiliary storage unit 51 may include at least one elongate body 66 having a first end 68 removably secured to an attachment point 60 the front attachment surface 56 of the second sidewall 20 and an opposing second end 70 removably secured to an attachment point 60 on the rear attachment surface 58 of the second sidewall 20 by fasteners or other attaching hardware. The elongate body 66 generally extends the length of the cargo area 16 defined by the second sidewall 20 and generally parallel to the longitudinal axis (not shown) of the vehicle. The at least one elongate body 66 may be configured to releasably engage and secure the first and second support rails 62, 64. Alternatively, first and second support rails 62, 64 may be integrally formed with the elongate body 66. It is also understood that the opposing elongate bodies may be secured to the at least one attachment points 60 on the first and second sidewalls 18, 20.

Figure 5:
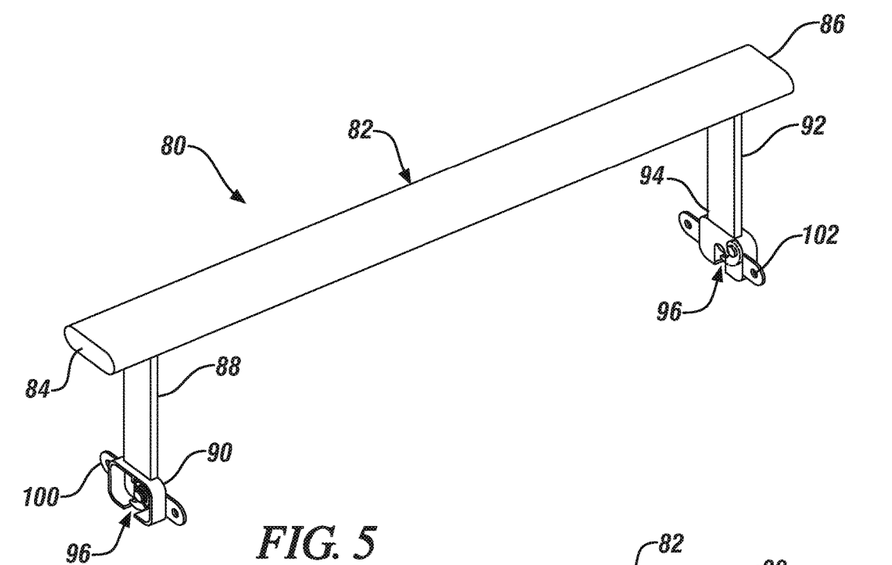
FIG. 5 is a perspective view of a cross rail assembly of the storage management system in accordance with the present disclosure.
Figure 6:
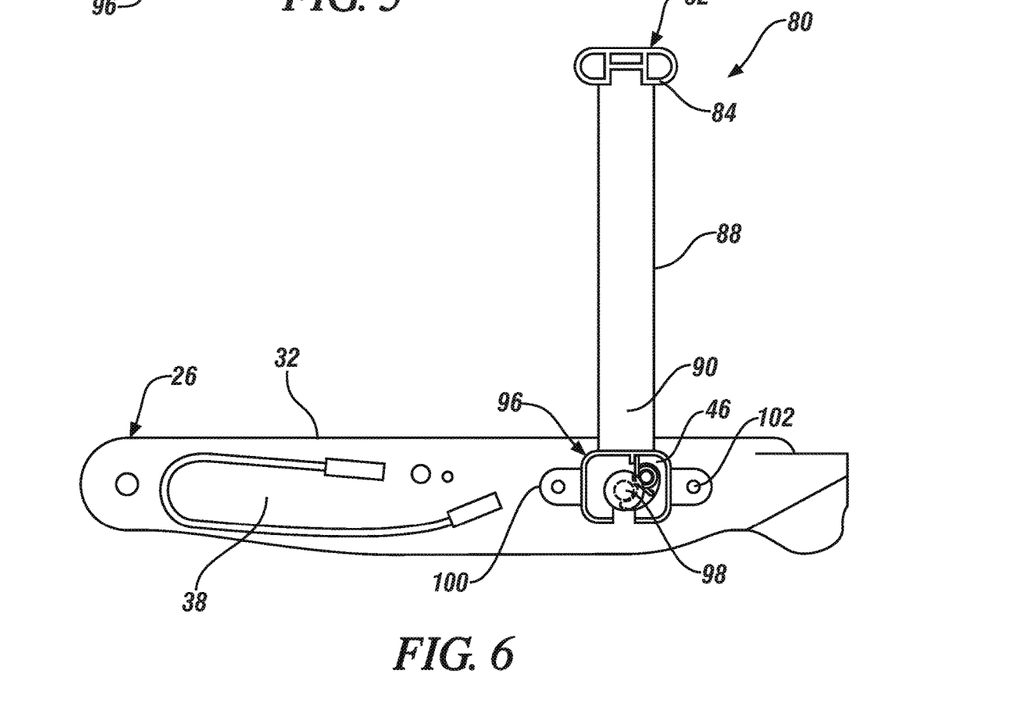
FIG. 6 is a side elevational view of the cross rail assembly disposed on the tailgate assembly, showing the cross rail assembly in a deployed position.

Referring now to FIGS. 5 and 6, cargo system 50 further includes an extension member 80 operatively connected to and adjustably positionable relative to the tailgate assembly 26. The extension member 80 may be positioned in a generally planar arrangement with the one or more support rails 62 to receive and support the one or more items 52 thereon and extend generally perpendicular relative to the first lateral edge 38 and second lateral edge 40 of the tailgate structure 32.

The extension member 80 includes a housing 82 having a first side 84 and an opposing second side 86. A first arm 88 extends from the first side 84 of the housing 82 and includes a segment 90 configured to be releasably secured to the first lateral edge 38 of the tailgate 26 and a second arm 92 extends from the second side 86 of the housing 82 and includes a segment 94 configured to be releasably secured to the second lateral edge 40 of the tailgate 26. Segments 90, 94 may include a mechanism 96 configured to releasably engage first and second portions 46 of the tailgate latch system 42 to position the extension member 80 relative to the tailgate structure 32.

As discussed above, the at least one tailgate latch 46 of the tailgate latch system 42 is operatively attached to an interior portion of the tailgate structure 32 and may be configured with an opening accessible from the exterior of the structure 32. A striker or other engageable component (not shown) on the storage compartment 15 of the vehicle body 12 is introduced to the at least one tailgate latch 46.

Latch 46 may include a fork bolt (not shown) movable between an unlatched position and a latched position to releasably capture the striker. A detent lever is selectively moved by an actuator between a latched position and an unlatched position. For example, when the actuator moves the detent lever into the latched position, the fork bolt is placed in the latched position to capture the striker. When the actuator moves the detent lever into the unlatched position, the fork bolt is placed in the unlatched position thus releasing the striker.

Referring back to FIGS. 5 and 6, segments 90, 94 of the first and second arms 88, 92 of the extension member 80 incorporate a latching mechanisms 96 or the like. It is understood that the latching mechanism 96 arrangement may be similar to that described above for the at least one latch 46 of latching system 42. Latching mechanisms 96 may be configured to releasably engage a striker or other engageable component 98 to position and secure the extension member 80 to the tailgate structure 32. As is shown in FIG. 6, the striker component 98 may include a first portion secured by the at least one latch 46 on tailgate structure 32 while the latching mechanism 96 on the segment 90 of the first arm 88 engages a second portion of the striker 98. Alternatively, the mechanism 96 may include a striker or other engageable component that may be releasably engaged by the at least one latch 46 of the tailgate latch system 42.

Segments 90, 94 may also include one or more projections 100 extending therefrom adjacent to the latching mechanism 96. The one or more projections 100 may include one or more apertures 102 sized to receive a fastener or other securing device (not shown). It is contemplated that one or more fasteners may be inserted through apertures 102 in the one or more projections 100 that align with corresponding apertures formed in the lateral edges 38, 40 of the tailgate structure 32 such that the fasteners may secure the extension member 80 to the tailgate structure 32.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
a body;
a cargo area at least partially defined by the body, the cargo area having a front wall, a first sidewall, an opposing second sidewall, a floor cooperating with and extending between the front wall and opposing first and second sidewalls;
at least one attachment point integrally formed on an inner periphery of at least one of the first and second sidewalls;
a tailgate assembly adjustably connected to the body and movable relative to the body between a first position and at least one second position, the tailgate assembly including a structure having a first lateral edge and a second lateral edge and a tailgate latch system disposed on the first and second lateral edges operable to latch the tailgate assembly to the body; and
a cargo system operatively connected to the tailgate assembly, the cargo system including:
an extension member having a housing, a first arm extending from a first side of the housing securable to the first lateral edge of the tailgate structure and a second arm extending from a second side of the housing securable to the second lateral edge of the tailgate structure, wherein each of the first arm and second arm includes a mechanism configured to releasably engage first and second portions of the tailgate latch system on the first and second lateral edges of the tailgate structure to position the extension member relative to the tailgate structure, and
an auxiliary storage unit including at least one elongate body extending between and releasably secured to the at least one attachment point and one or more support rails releasably engaging the at least one elongate body, wherein the one or more support rails of the auxiliary storage unit are positioned in the cargo area in a planar arrangement and cooperate with the extension member disposed on the tailgate structure when the tailgate assembly is positioned in the at least one second position to receive one or more items thereon.

2. The vehicle of claim 1 wherein the tailgate assembly is disposed in the first position when the body covers both the first and second lateral edges of the tailgate structure to restrict access to the cargo area and the at least one second position when the first and second lateral edges of the tailgate structure are moved relative to the body to expand the cargo area.

3. The vehicle of claim 1 wherein the first arm of the cargo system extension member releasably engages a first portion of the tailgate latch system on the first lateral edge of the tailgate structure and the second arm of the cargo system extension member releasably engages a second portion of the tailgate latch system on the second lateral edge of the tailgate structure.

4. The vehicle of claim 3 wherein the first arm further comprises a segment releasably secured to the first lateral edge of the tailgate structure and the second arm includes a segment releasably secured to the second lateral edge of the tailgate structure, wherein each of the segments of the first arm and second arm incorporate a mechanism releasably engaging each of the first and second portions of the tailgate latch system to position the extension member relative to the tailgate structure.

5. The vehicle of claim 1 wherein the at least one elongate body of the auxiliary storage unit further comprises a first elongate body releasably secured to the at least one attachment point on the first sidewall and a second elongate body releasably secured to the at least one attachment point on the opposing second sidewall.

6. The vehicle of claim 5 wherein the one or more support rails further comprise a first support rail extending generally laterally between and releasably engaging the first and second elongate bodies adjacent the front wall of the cargo area and a second support rail extending generally laterally between and releasably engaging the first and second elongate bodies adjacent the tailgate structure such that the first and second support rails of the auxiliary storage unit are generally planar with the housing of the extension member on the tailgate structure when the tailgate structure is in the at least one second position.

7. The vehicle of claim 5 wherein the at least one attachment point is an arcuate shaped portion integrally formed in the inner periphery of at least one of the first sidewall and the second sidewall to receive and secure a mating portion of the at least one elongate body of the auxiliary storage unit of the cargo system.

8. The vehicle of claim 5 wherein the each of the first and second elongate bodies further comprises a first end removably secured to an attachment point adjacent a front attachment surface of the at least one sidewall and an opposing second end removably secured to an attachment point adjacent a rear attachment surface of the at least one sidewall.

9. The vehicle of claim 4 wherein the mechanism further comprises a striker component cooperating with the segments on the first and second arms that is releasably engaged by the at least one latch of the tailgate latch system to position and secure the extension member to the tailgate structure.

10. The vehicle of claim 9 wherein the mechanism further comprises a striker component having a first portion secured by the at least one latch on tailgate structure and a second portion secured by a latching mechanism on each of the segments of the first and second arms.

11. A vehicle comprising:
   a body;
   a cargo area at least partially defined by the body having a front wall, a first sidewall, an opposing second sidewall, a floor cooperating with and extending between the front wall and opposing first and second sidewalls;
   a tailgate assembly adjustably connected to the body and movable relative to the body between a first position and at least one second position, the tailgate assembly including a structure having a first lateral edge and a second lateral edge and a tailgate latch system disposed on the first and second lateral edges operable to latch the tailgate assembly to the body; and
   a cargo system operatively connected to the tailgate assembly, the cargo system including:
      an extension member having a housing, a first arm extending from a first side of the housing having a segment releasably securable to the first lateral edge of the tailgate structure and a second arm extending from a second side of the housing having a segment releasably securable to the second lateral edge of the tailgate structure,
      wherein each of the segments of the first arm and the second arm of the extension member incorporate a mechanism releasably engaging a first portion of the tailgate latch system on the first lateral edge of the tailgate structure and the a second portion of the tailgate latch system on the second lateral edge of the tailgate structure to position the extension member relative to the tailgate structure,
   wherein the mechanism further comprises a striker component cooperating with the segments on the first and second arms that is releasably engaged by the at least one latch of the tailgate latch system to position and secure the extension member to the tailgate structure.

12. The vehicle of claim 11 wherein the tailgate assembly is disposed in the first position when the body covers both the first and second lateral edges of the tailgate structure to restrict access to the cargo area and the at least one second position when the first and second lateral edges of the tailgate structure are moved relative to the body to expand the cargo area.

13. The vehicle of claim 11 further comprising at least one attachment point integrally formed on an inner periphery of at least one of the first and second walls.

14. The vehicle of claim 13 wherein the cargo system further comprises an auxiliary storage unit including at least one elongate body extending between and releasably secured to the at least one attachment point and one or more support rails releasably engaging the at least one elongate body and extending between the first and second sidewalls, wherein the one or more support rails of the auxiliary storage unit are positioned in the cargo area in a planar arrangement and cooperate with the extension member disposed on the tailgate structure when the tailgate structure is positioned in the at least one second position to receive one or more items thereon.

15. The vehicle of claim 14 wherein the auxiliary storage unit further comprises:
   a first support rail extending generally laterally between and releasably secured to the at least one attachment point on the first and second sidewalls adjacent the front wall of the cargo area; and
   a second support rail extending generally laterally between and releasably secured to the at least one attachment point on the first and second sidewalls adjacent the tailgate structure.

16. The vehicle of claim 11 wherein the mechanism further comprises a striker component having a first portion secured by the at least one latch on tailgate structure and a second portion secured by a latching mechanism on each of the segments of the first and second arms.

17. A cargo system for a vehicle having a cargo area at least partially defined in a vehicle body having a front wall, a first sidewall, an opposing second sidewall, a floor cooperating with and extending between the front wall and opposing first and second sidewalls, at least one attachment point integrally formed on an inner periphery of at least one of the first and second sidewalls and a tailgate assembly having a tailgate structure adjustably connectable to the vehicle body having a tailgate latch system disposed on the first and second lateral edges of the tailgate structure and operable to latch the tailgate assembly to the body, the cargo system comprising:
   an extension member having a housing, a first arm extending from a first side of the housing securable to the first lateral edge of the tailgate structure and a second arm extending from a second side of the housing securable to the second lateral edge of the tailgate structure;
   a segment disposed on the first arm releasably secured to the first lateral edge of the tailgate structure and a segment disposed on the second arm releasably secured to the second lateral edge of the tailgate structure,
   wherein each of the segments of the first arm and second arm incorporate a mechanism releasably engaging first and second portions of the tailgate latch system to position the extension member relative to the tailgate structure;
   a striker component cooperating with the segments on the first and second arms that is releasably engaged by the at least one latch of the tailgate latch system to position and secure the extension member to the tailgate structure,
   wherein the striker component includes a first portion secured by the at least one latch on the tailgate structure and a second portion secured by a latching mechanism on each of the segments of the first and second arms; and
   an auxiliary storage unit including at least one elongate body extending between and releasably secured to the at least one attachment point and one or more support rails releasably engaging the at least one elongate body, wherein the one or more support rails of the auxiliary storage unit are positioned in the cargo area in a planar arrangement and cooperate with the extension member disposed on the tailgate structure when the tailgate assembly is positioned in the at least one second position to receive one or more items thereon.

18. The cargo system of claim 17 wherein the auxiliary storage unit further comprises:
    a first support rail extending generally laterally between and releasably secured to the at least one attachment point on the first and second sidewalls adjacent the front wall of the cargo area; and
    a second support rail extending generally laterally between and releasably secured to the at least one attachment point on the first and second sidewalls adjacent the tailgate structure.

19. The cargo system of claim 17 wherein the mechanism segments on each of the first and second arms include one or more projections including one or more apertures sized to receive a securing device, wherein the one or more apertures align with one or more corresponding apertures formed in the lateral edges of the tailgate structure such that the securing device may secure the extension member to the tailgate structure.

20. The cargo system of claim 17 wherein the at least one elongate body of the auxiliary storage unit further comprises:
    a first elongate body releasably secured to the at least one attachment point on the first sidewall; and
    a second elongate body releasably secured to the at least one attachment point on the opposing second sidewall,
    wherein the each of the first and second elongate bodies includes a first end removably secured to an attachment point adjacent a front attachment surface of the first and second sidewalls and an opposing second end removably secured to an attachment point adjacent a rear attachment surface of the first and second sidewalls.

* * * * *